M. A. WHITING.
MOTOR CONTROL SYSTEM.
APPLICATION FILED JAN. 18, 1913.
1,093,670.
Patented Apr. 21, 1914.
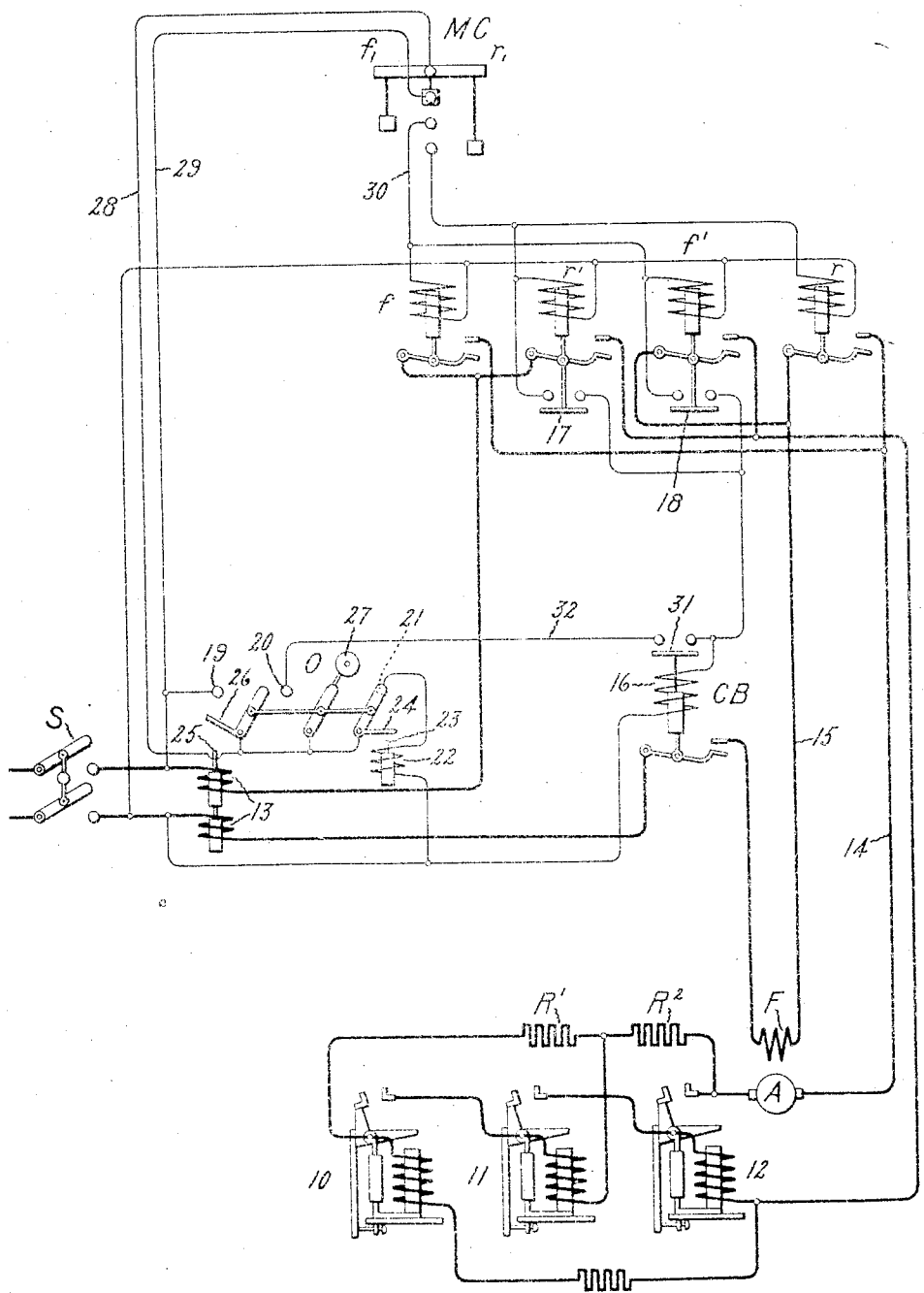

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

MOTOR-CONTROL SYSTEM.

1,093,670. Specification of Letters Patent. Patented Apr. 21, 1914.

Application filed January 18, 1913. Serial No. 742,839.

*To all whom it may concern:*

Be it known that I, MAX A. WHITING, a citizen of the United States, residing at Schenectady, county of Schenectady, State of New York, have invented certain new and useful Improvements in Motor-Control Systems, of which the following is a specification.

This invention relates to the control of electric motors and has for its object the provision of means whereby an electric motor may be started, stopped and generally controlled in a reliable and efficient manner while at the same time it is protected against the occurrence of abnormal circuit conditions either during starting and normal running, or while the apparatus is in an inoperative condition.

My invention relates more specifically to the provision of means whereby protection against the occurrence of overload conditions is afforded to an electric motor and its control apparatus.

In the starting of electric motors by the use of successively actuating contactors for cutting out starting resistance under the control of a master controller, it is common to employ a circuit breaker which will open upon the occurrence of abnormal circuit conditions. The arrangement is usually such that when the circuit breaker is opened it will automatically close or reset only when the master controller is returned to off position. When the master controller is in the off position and the line switches are left closed one side of the line is still closed at the circuit breaker although the motor circuit is open. Under these conditions a dangerous short circuit may be caused by grounding of the wiring.

One of the objects of my invention is to provide means whereby upon the occurrence of such conditions the circuit breaker will open and remain open until the operator moves the master controller to start the motor.

In carrying out my invention I employ a circuit breaker which is electromagnetically closed upon the closing of one of the contactors for starting the motor, preferably the first contactor of the series. An overload relay having an overload coil on each side of the line is provided which opens the circuit breaker upon the occurrence of an overload upon the circuit and can only be closed by returning the master controller to off position. It is not sufficient, therefore, to simply return the master controller to off position in order to close the circuit breaker, but a further step must be taken, namely, the master controller must be moved to operative position so as to close one of the contactors, since the circuit breaker can only be closed upon the closing of such contactor. By this arrangement the circuit breaker will not ordinarily open when the master controller is moved to off position but if an overload should occur at that time the circuit breaker will open so as to completely cut off the motor from the line, and the circuit breaker cannot be again closed until the overload is removed and the master controller is moved to close one of the contactors.

Other objects and purposes of my invention will appear in the course of the following specification in which I have disclosed my invention embodied in concrete form for purposes of illustration.

Referring to the accompanying drawing illustrating my invention, A represents the armature and F the field of an electric motor to be controlled. I have shown this motor of the series type for purposes of illustration, although it is obvious that my invention is in no sense limited to this type of motor. R, R' and R² represent three sections of resistance for starting this motor by being successively cut out of circuit.

$f$ and $f^2$ represent two line contactors for closing the motor circuit for operating in the forward direction and $r$ and $r'$ represent two line contactors for closing the motor circuit for operating in the reverse direction. The master controller MC is arranged to control these contactors so that when turned to the left into the position $f_1$ the contactors $f$ and $f'$ will be energized and when turned to the right into the position $r_1$ the contactors $r$ and $r'$ will be energized.

A series of contactors 10, 11 and 12 are provided for automatically cutting out the sections of resistance R, R' and R². When the contactors $f$ and $f'$ are closed, for instance, the current will pass from the positive side of the line through the switch S through one of the overload coils 13 hereinafter referred to, through the contact of the contactor $f$, conductor 14, armature A, resistance R², R', through the winding of 11 the contactor 10, resistance R, through contacts of the contactors $f'$, conductor 15, field F, through the contacts of the circuit breaker CB, hereinafter referred to, and back to line through the other overload coil 13. The contactors 10, 11 and 12 are represented here as of the series type disclosed in the Murphy application, Serial No. 608,652, the characteristic feature of which is that the contactors do not close when the current is high, but do close when the current drops to a predetermined value. Upon the rush of current due to the closing of the motor circuit, therefore the contactor 10 will not be closed until the current is reduced by the speeding up of the motor armature and then the contactor 10 will close and short circuit the section of resistance $R'$ through the winding of contactor 11. In like manner the sections of resistance R and $R^2$ will be successively cut out of circuit. The operation of these contactors forms no part of my invention and it is sufficient therefore to say that when the motor is up to running speed the resistance sections are all cut out and the contactors 10 and 11 are opened leaving only the contacts of contactor 12 closed with the winding of this contactor in series with the contacts.

As thus far described the arrangement is of the type now well known and operates in a well known manner. In order, however, to open the motor circuit upon the occurrence of an overload I have provided a circuit breaker CB. This circuit breaker as shown is of the contactor type and is closed by the winding 16 just the same as the ordinary contactor. It will be noted that the winding of the circuit breaker will be energized only through the interlocking contacts 17 or 18 upon the line contactors $r'$ and $f'$ respectively. In order that these line contacts shall close it is first necessary that the overload relay O shall be closed or "set". This overload relay as illustrated in the drawing consists of a triple pole switch having the stationary contacts 19, 20 and 21, two of which, 19 and 20, are in engagement with the movable switch arms when the relay is closed, while the latter contact 21 is in engagement with its movable switch arm when the relay is open. The relay is closed by the coil 22 which is shown conventionally in the drawing as having a plunger 23 which rises when its coil is energized so as to engage the projection 24 and move the overload coil to closed position, at the same time breaking the circuit of the winding 22 at the contact 21. When either or both of the overload coils 13 is energized above a predetermined value, the operating mechanism, shown conventionally as consisting of a rod 25 having upon it the course for the coils 13 is so arranged that when it rises it engages a projection 26, which moves the relay to open position as shown in the drawing. The specific construction of this relay forms no part of my invention and it is to be understood that it is shown merely in a diagrammatic way for purposes of illustration. As illustrated, the relay contacts are not moved throughout their range of movement by the coil but are moved by the weight 27 which carries the switch to proper position in either direction after it has been moved over center by the plungers of the coils.

The arrangement of circuits and mode of operation of my device are as follows: Assuming that the parts are in the position shown in the drawing and the line switch S is closed, the actuating winding 22 of the overload relay will immediately be energized, the circuit being from the positive side of the line, through the wire 29, through the contacts of the master controller, which is in the off position, wire 28, contact 21 and coil 22 to the negative side of the line. This will move the relay to the closed or "set" position and deënergize the actuating coil 22. If now the master controller is moved in either direction, as, for instance, into the position $f_1$ for forward movement, the contactors $f$ and $f'$ will be closed as before described. The closing of the contactor $f'$ completes a circuit through the actuating winding 16 of the circuit breaker CB, the circuit being as follows: From the positive side of the line to the contact 19 of the overload relay, thence through wire 28 to the master controller, wire 30, interlock 18, winding 16, to the other side of the line. The circuit breaker now closes and the motor will start and come up to running speed by cutting out sections of starting resistance as above described. In like manner, if the master controller is moved to the reverse position $r_1$, the contactors $r$ and $r'$ will be closed to start the motor in the reverse direction. The circuit breaker will then be closed through the interlock 17 on the contactor $r'$. If, now, during normal running, an overload occurs on the line the overload relay will be moved to the position shown in the drawing, thereby opening the circuit breaker and the line contactors and stopping the motor. In order to again start the motor the master controller must be brought back to the off position as it is only in this position that the winding 22 can be energized to again close or reset the overload relay. Assume, however, that while the motor is normally running the master controller is moved back to the off position with the overload relay in its closed position, since no overload has occurred to open it. When the master controller is moved to off position the line contactors which happen to be closed will be opened since the circuits of their energizing windings will be opened at the contacts of the master controller. The circuit breaker, however, is not opened.

It will be noted that while the actuating circuit of the circuit breaker passes through the interlocks on the line contactors, there is a maintaining circuit for the circuit breaker which is closed at the interlock 31 on the circuit breaker, this maintaining circuit being as follows: From the positive side of the line, through the contact 19 of the overload relay, contact 20, wire 32, interlock 31, winding 16 of the circuit breaker, back to the other side of the line. The circuit breaker will therefore remain closed as long as the overload relay is in its closed position. While the motor is stopped so long as the switch S is closed, there is danger of overload occurring due to grounds or other causes, since only one side of the line is opened. If such an overload should occur, the overload relay will be moved to open position, thereby opening the circuit breaker and completely cutting off the motor. Furthermore, the return of normal conditions is not sufficient to close the circuit breaker although it will close the overload relay. In order to close the circuit breaker it is necessary that the master controller be moved to operative position so as to close one of the line contactors $f'$ or $r'$ since the circuit breaker can only be closed through one of the interlocks 17 and 18 on these contactors. This insures that upon the appearance of such an overload the circuit breaker will immediately open and will not close again until the operator arrives to remove the cause of the trouble and start the motor.

While I have described my invention as embodied in concrete form and as operating in a specific manner in accordance with the provisions of the patent statutes, it should be understood that I do not limit my invention to the specific arrangement herein disclosed since various modifications thereof will suggest themselves to those skilled in the art without departing from the spirit of my invention, the scope of which is set forth in the annexed claims.

What I claim as new and desire to secure by Letters Patent of the United States, is:

1. The combination with an electric motor, of a controller therefor, an overload relay having an actuating coil on each side of the supply circuit and arranged to close in the off position of said controller, and a circuit breaker electromagnetically closed upon the movement of the controller to operative position and controlled by said relay.

2. The combination with an electric motor, of a controller therefor, an overload relay having an overload coil on each side of the supply circuit arranged to be electromagnetically closed in the off position of said controller, a circuit breaker having an actuating winding which is energized upon the movement of the controller to operative position, and a maintaining circuit controlled by said relay.

3. The combination with an electric motor, of a controller therefor, an overload relay arranged to be closed in the off position of said controller, and a circuit breaker having an actuating circuit which is energized upon the movement of the controller to operative position, and a maintaining circuit controlled by said relay.

4. The combination with an electric motor, of a contactor for controlling the circuit thereof, a master controller therefor, an overload relay arranged to be closed in the off position of the master controller for controlling the circuit of said contactor, and a circuit breaker having an actuating circuit which is energized upon the closing of said contactor and a maintaining circuit controlled by said relay.

5. The combination with an electric motor, of a plurality of consecutively operating contactors for controlling the circuit thereof, a master controller therefor, an overload relay arranged to be closed in the off position of said master controller for controlling the operation of said contactors, and a circuit breaker having an actuating circuit which is energized upon the closing of the first of the contactors, and a maintaining circuit controlled by said relay.

6. The combination with an electric motor, of a plurality of consecutively operating contactors for controlling the circuit thereof, a master controller therefor, an overload relay having an overload coil on each side of the supply circuit, electromagnetic means for closing the said relay in the off position of the master controller to control the operation of the said contactors and a circuit breaker having an actuating circuit which is energized upon the closing of the first of said contactors, and a maintaining circuit controlled by said relay.

In witness whereof, I have hereunto set my hand this 16th day of January, 1913.

MAX A. WHITING.

Witnesses:
BENJAMIN B. HULL,
HELEN ORFORD.